March 24, 1970 H. HEIMBERGER 3,501,816

FLUID-TIGHT SLIDE-FASTENER

Filed Aug. 17, 1967 2 Sheets-Sheet 1

INVENTOR.
HELMUT HEIMBERGER
BY
Karl F. Ross
ATTORNEY

March 24, 1970 H. HEIMBERGER 3,501,816

FLUID-TIGHT SLIDE-FASTENER

Filed Aug. 17, 1967 2 Sheets-Sheet 2

HELMUT HEIMBERGER
INVENTOR.

BY

Karl F. Ross
ATTORNEY

United States Patent Office 3,501,816

Patented Mar. 24, 1970

3,501,816

FLUID-TIGHT SLIDE-FASTENER

Helmut Heimberger, Essen, Germany, assignor to Opti-Holding AG., Glarus, Switzerland, a corporation of Switzerland Continuation-in-part of applications Ser. No. 534,356, Mar. 15, 1966, and Ser. No. 651,269, July 5, 1967. This application Aug. 17, 1967, Ser. No. 661,434

Claims priority, application Germany, Aug. 26, 1966, O 11,910

Int. Cl. A44b *19/00*

U.S. Cl. 24—205.1 6 Claims

ABSTRACT OF THE DISCLOSURE

A slide-fastener assembly having a pair of interengageable elastomeric sealing strips encapsulating respective helicoidal or meandering coupling elements with a coating on the stringer tapes wherein the slide-fastener halves are originally laterally reversed with respect to one another (and their normal positions) and interconnected for extrusion of the elastomeric material therearound, then separated and reconnected in their normal orientation whereby overhanging portions of the strips of high sealing effectiveness, are formed. The sealing strips include wedge-shaped formations on opposite sides of the assembly.

This application is a continuation-in-part of my copending application Ser. No. 651,269, filed July 5, 1967 as a continuation-in-part of application Ser. No. 534,356 of Mar. 15, 1966 (now U.S. Patent No. 3,389,441 issued June 25, 1968.)

My present invention relates to improvements of the production of fluid-tight or self-sealing fastener assemblies and, more particularly, to a method of making slide-fastener assemblies having mutually engageable sealing strips extending along the respective coupling elements.

In my application Ser. No. 543,356 (U.S. Patent No. 3,389,441), I have disclosed a fluid-tight slide-fastener assembly whose slide-fastener halves each include interengageable coupling members, e.g. helicoidal or meandering filaments of thermally set linear polyamides which are partly embedded in an elastomeric strip of synthetic resin forming a pair of elongated sealing strips continuously contacting each other in the closed condition of the fastener. The elastomeric material, such as foamed polyethylene, may also envelop the stringer tapes which serve as carriers for the respective coupling elements. In the improvement described and claimed in the subsequently filed application Ser. No. 651,269, I have provided means for enhancing the sealing effect and otherwise improving the production of such slide fasteners. More specifically, the latter application relates to the provision of mutually complementary, yieldably interlocking formations along confronting longitudinal surfaces of the two elastomeric strips. These formations, advantageously comprising one or more grooves and one or more ribs extending over the full length of the strips, have sufficient shear strength to resist transverse stresses which otherwise might be formed in the fastener halves so as to create a leakage path. Thus, besides making the assembly truly fluid-tight, these formations also serve as effective reinforcements for the coupling members of the fasteners. In accordance with another feature of the invention there described, a slider coacts with the two fastener halves and straddles the elastomeric strips in positive engagement with the formations by being provided, on opposite sides of the wedge-shaped web connecting the upper and lower blades of the slide shaped web connecting the upper and lower blades of the slide fastener, with a recess and a projection respectively mating with the male and female portions of the elastomeric sealing strips. Moreover, to improve the sealing effectiveness at the ends of the slide fastener, the endstop member thereof may be formed of the same or similar elastomeric material as the two sealing strips in such manner as to envelop the extremities of the latter, thereby firmly anchoring the strips to the underlying sringer tapes at locations beyond the ends of the coupling members. If the fastener forms a closure for a slit closed at both ends, two such endstop members may be provided.

My application Ser. No. 651,269 also describes an improved method of manufacturing the slide-fastener assembly with the sealing strips by an extrusion process. The joint extrusion of the coupling members and their elastomeric fillers had already been suggested in the earlier of the above-identified applications and was generally followed by a shaping operation (e.g. between rollers) to which the sealing strips may be individually subjected in a partly cured state after being separated from each other. In accordance with the modified system of application Ser. No. 651,269, the separation of the extruded strips is accomplished with the aid of a suitably shaped blade along a transverse median line having a lobed portion which conforms to the cross-sectional outline of the complementary sealing formations.

It will be immediately recognized that either the individual deformation of the sealing strips or the use of mating male and female formations (and their production by suitably shaped blades) is required if the sealing strips are to be formed on the coupling elements in their interconnected state and are still to bear against one another with an elastic force to ensure effective sealing operation. Both techniques involve considerable effort and equipment and it is, therefore, the principal object of the present invention to extend the principles originally set forth in the aforementioned copending applications to a method of making slide-fastener structures in which these disadvantages can be avoided.

A further object of my invention is to provide a slide-fastener structure in which the sealing strips bear against one another with considerable force and yet can be formed without the compression or plastic-deformation step or the use of blades of the complexity required in the making of tongue-and-groove structures.

These objects and others which will become apparent hereinafter are attainable, in accordance with the present invention, by extruding, injecting or otherwise molding the elastomeric material in respective sealing strips onto the stringer tapes and/or coupling elements after they have been interconnected in laterally reversed relation relative to the normal positions of the slide-fastener halves in the finished slide-fastener assembly. In this manner, it is possible to mold the major portions of the sealing strips, which may resiliently bear upon one another when the slide fastener is coupled in use, on opposite sides of a median plane through the interconnected structure which may then be separated and the slide-fastener halves reoriented and connected in their normal positions. Since one slide-fastener half is reversed with respect to the other, the sealing strips are disposed on opposite sides of the structure and can overhang the other coupled element or slide-fastener half, thereby permitting the projecting portions of these strips (i.e. those parts which extend beyond the outline of the stringer tape and coupling element) to bear upon one another with considerable sealing force. Advantageously, the sealing strips are so shaped that they are of generally wedge-like or outwardly convergent profile so that their mutually engageable portions are deformable and bear upon one another in surface contact to ensure a tight seal. In general, a coupling element is mounted along one side of the stringer tape and, in the normal position of the slide fastener, both coupling elements lie along the corresponding sides of the tape. In the "reversed" condition of one of the slide-fastener halves during extrusion of the sealing strip thereon, the coupling elements appear to lie along opposite (rather than corresponding) surfaces of the stringer tapes.

According to a more specific feature of this invention, one of the slide-fastener halves is laterally reversed with respect to the other and coupled therewith while a portion of the slide-fastener half is embedded in the elastomeric material constituting the sealing strip. The coupling elements may be wholly or partly surrounded by the elastomeric material as described in the aforementioned copending applications or the sealing strips may be provided along the surfaces of the stringer tapes opposite those carrying the coupling elements. In addition, the stringer tape may be wholly or partly covered or encapsulated in the elastomeric material which may form a monolithic structure with the respective sealing strip. After the sealing strips have been formed on opposite sides of the median plane parallel to the stringer tapes and through the laterally reversed slide-fastener structure, the coupling elements are disengaged, subjected to further lateral reversal so that the slide-fastener halves assume their normal position vis-a-vis one another, and reconnected to form the slide-fastener assembly. A slider may then be provided as set forth in my application Ser. No. 651,269. The separation of the sealing strips from one another, no longer requiring the complex mechanisms deemed necessary heretofore, may use simple "profile" or shaped blades disposed externally of the extrusion assembly or within the die, the blades being mutually parallel and inclined to the median plane.

According to a further feature of this invention, the corresponding flanks of the wedge-profile sealing strips are parallel to one another when formed in the intermediate structure so that they are inclined toward one another symmetrically when the intermediate structure is decoupled and the slide-fastener halves reversed to place them in their normal conditions. The separation of the sealing strips, which are here disposed effectively on opposite sides of the intermediate structure, can be effected without complex carving techniques or subsequent treatment. Furthermore, relatively sharply projecting edges can be formed on the respective sealing strips, thereby increasing the sealing force by which the strips engage one another.

According to another aspect of this invention, a slide-fastener structure is formed by molding (e.g. extruding) the elastomeric strips onto the slide-fastener halves. In accordance with one feature, the sealing strips partly encapsulate the coupling elements and are, therefore, disposed along the side of the stringer tape upon which the coupling elements are anchored (e.g. by chain-stitching or the like). In this arrangement, the heads of the coupling elements, the sealing core therewithin and the sealing strips overlying the coupling elements are on the same side. Alternatively, I may provide the sealing strips on the reverse side of the stringer tape (i.e. along the side thereof opposite that upon which the coupling elements are provided). In this case, the coupling elements are not embedded in the sealing strips and the sealing strips can project further beyond the outlines of the slide-fastener halves and/or can be relatively less thick so as to be more readily deformable and increase the sealing character. When the coupling elements in the sealing strips are disposed on opposite sides of the support or stringer tapes, transverse shifts of the slide fastener do not give rise to an uncovering of the gap between the stringer tapes as is the case with systems in which the coupling elements and the sealing strips are on the same side.

The above and other objects, features and advantages of the present invention will become more readily apparent from the following description, reference being made to the accompanying drawing in which.

Figure 5:
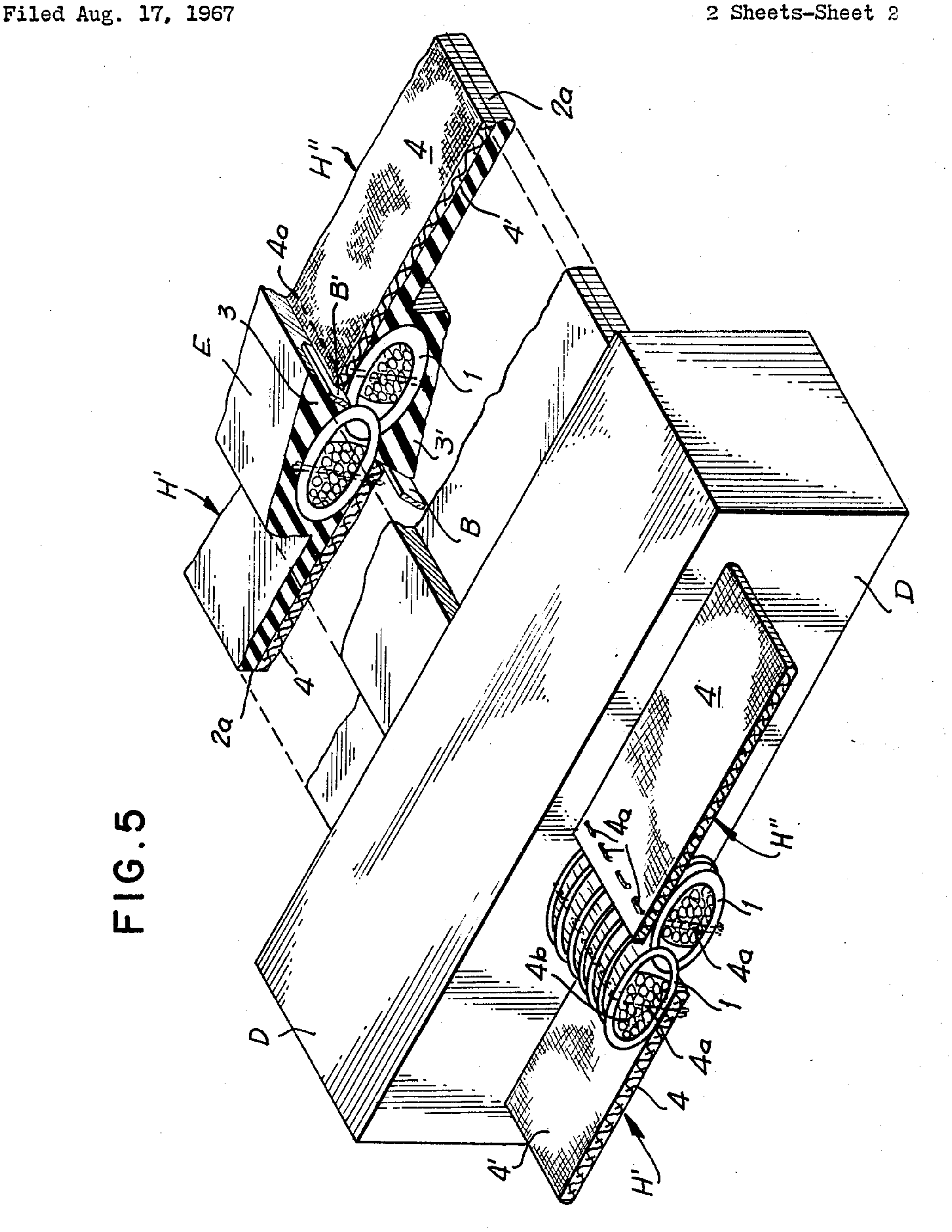
FIG. 5 is a perspective view diagrammatically illustrating the method of the present invention.

Referring first to FIG. 5, it can be seen that the method of this invention involves the formation of respective slide-fastener halves H′ and H″, each from a respective fabric stringer tape 4 along one surface 4′ of which a helicoidal coupling coil 1 is mounted by chain-stitching *4a* in the conventional manner. Within each coil 1 a sealing-type packing, core or cord *4b* has been inserted before the coupling element, which may also be of the meandering type, has been inserted as described in the earlier of the above-mentioned copending applications. The slide-fastner halves H′ and H″ (FIG. 5) have been coupled together with the half H″ in its laterally reversed or inverted configuration so that the upper surface 4′ of this slide-fastener half has been turned downwardly.

As described in the copending applications mentioned above, the interconnected slide-fastener halves H′ and H″ are advanced through an extrusion die D in which a layer of elastomeric material E (shown in greater detail in FIGS. 1 through 4) may be extruded therearound. A blade structure diagrammatically represented at B and B′ is provided along the path of the advancing strip to facilitate separation of the slide-fastener halves H′ and H″ downstream of these profile-blade members. Upon separation of the slide-fastener halves H′ and H″, the latter can be reinforced and connected with slide-fastener half H′ to produce a slide-fastener assembly adapted to receive a slider, endstop members and the like in the usual manner.

Figure 1:
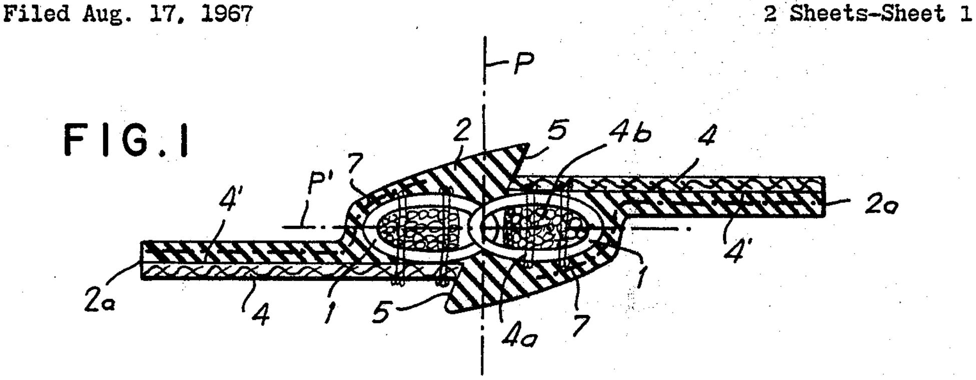
FIG. 1 is a diagrammatic cross-sectional view of a slide-fastener structure after the extrusion of the sealing strip thereon, showing the relationship of the inverted slide-fastener halves.

In FIG. 1, I show a similar assembly wherein, however, the layer E of elastomeric material forms a sealing strip 2 partly encapsulating the coupling elements 1 and permeating them. The coupling elements are stitched to the fabric bands 4 as previously described and are partly occupied by sealing cores *4b* illustrated herein cross-section. The elastomeric material also permeates the textile bands 4 and may form a layer 2*a* partly coating the surfaces of these bands along which the sealing strips and coupling elements are provided. The sealing strips 2 are formed with mutually parallel flanks 5 which are inclined relatively steeply to the surfaces 4′ of the laterally reversed (inverted) fastener halves and terminate in projecting lips or ridges 3 which extend beyond the transverse median plane P between the slide-fastener halves. These sealing strips are, of course, also formed symmetrically on opposite sides of the horizontal median plane P′ through the slide-fastener structure the two stringer tapes 4 lying at different levels (below and above plane P′) on opposite sides of the longitudinal plane of symmetry P of the fastener structure, thereby bracketing that structure.

Figure 2:
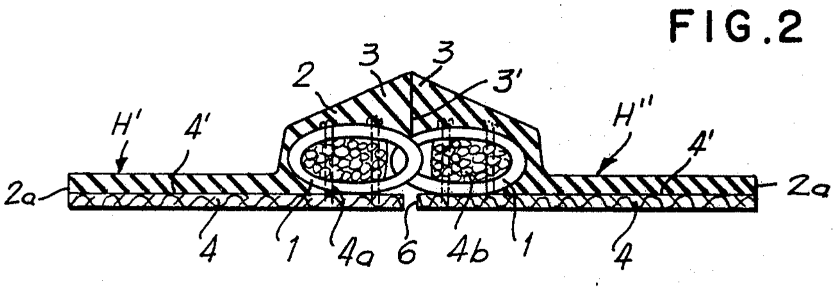
FIG. 2 is a cross-sectional view of the embodiment of FIG. 1 after reorientation and illustration of the fastener in its closed condition.

As can be seen from FIG. 2, when the assembly of FIG. 1 is separated and the slide-fastener halves H′ and H″ reconnected, the projecting wedge-shaped tips 3 form deformable edges in surface contact at 3′ to effect a sealing action. In this case, the gap 6 between the strips 4 is exposed. The wedge-shaped formations 5, however, of the profiled strips 2 produce a tight seam as these strips longitudinally abut each other in a coplanar position of their stringer tapes 4.

Figure 3:
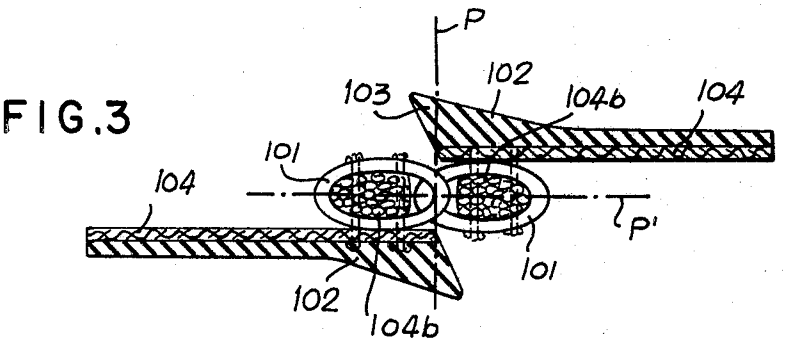
FIG. 3 is a cross-sectional view similar to FIG. 1 but illustrating another embodiment of this invention.
Figure 4:
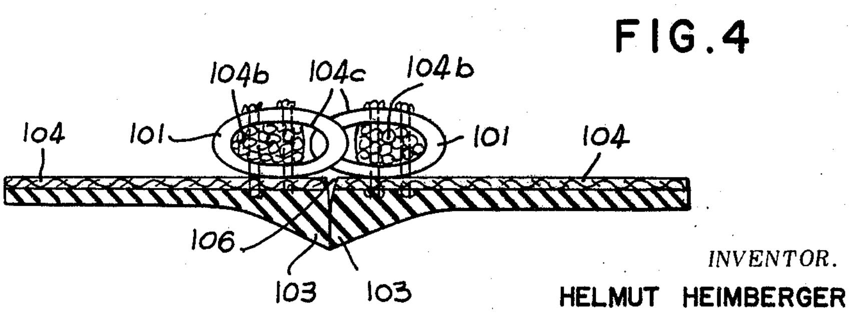
FIG. 4 is a cross-sectional view similar to FIG. 2 showing the repositioned part of FIG. 3.

In FIGS. 3 and 4, I show a more strongly projecting lip or rib 103 which is disposed on each side of the stringer tapes 104 along surfaces thereof opposite that upon which the coupling elements 101 are stitched via their sealing cores 104*b*. In this case, the elastomeric material 102 does not encapsulate the coupling elements but underlies the rear surface of the stringer tape. As shown in FIG. 4, the heads 104*c* of the coupling elements interengage and bear upon the cores **104*b* and seal the upper surface of the assembly when the laterally reversed slide-fastener halves are reoriented. On the opposite side of the gap 106, the ridges 103 of the sealing strips engage one another in a fluid-tight seal. In this embodiment (see FIG. 3) it is clear that no blade means whatever is necessary to ensure separation of the coupling elements when the laterally reversed structure is to be separated since individual extrusion beads are produced. Fabric reinforcements 7** are embedded into the elastomeric material (see FIG. 1) as indicated in dot-dash lines and partly overlie the coupling elements as well as the tape. Such reinforcements are preferably vulcanized into the elastomeric material to strengthen the latter and increase the stiffness of the bodies with respect to a slider head. In the system of FIGS. 3 and 4, the relatively soft elastomeric bodies do not affect the slider.

I claim:

1. An intermediate product in the manufacture of a slide fastener, comprising:

a slide-fastener structure consisting of a pair of interconnected halves a pair of stringer tapes disposed on opposite sides of a longitudinal plane of symmetry bisecting said structure, said stringer tapes lying at two different levels bracketing said structure, each of said halves being secured to a surface of a respective stringer tape;

and a pair of profiled strips of elastomeric material molded in laterally reversed and centrally symmetrical relationship onto mutually opposite surfaces of said stringer tapes, respectively, one of said strips lying on one side and the other strip lying on the other side of said structure, the profile of each strip including a wedge-shaped formation projecting beyond said plane of symmetry and overhanging the slide-fastener half secured to the opposite stringer tape whereby said formations produce a tight seam upon relative reversal of said slide-fastener halves into an operative position in which said stringer tapes are coplanar and said strips longitudinally abut each other along said plane of symmetry.

2. A product as defined in claim 1 wherein said strips partly envelop said halves.

3. The product defined in claim 1 wherein said interconnected halves are each stitched to the respective stringer tape.

4. A product as defined in claim 3 wherein said halves are provided with respective cores partly occupying same, said cores being also stitched to the respective stringer tapes.

5. The product defined in claim 1, further comprising a reinforcing inlay embedded in the elastomeric material of each profiled strips.

6. The product defined in claim 1 wherein said strips have parallel flanks.

References Cited

UNITED STATES PATENTS

| | | | |
|---|---|---|---|
| 2,296,468 | 9/1942 | Feist | 24—205.1 |
| 2,371,776 | 3/1945 | Van Orman | 24—205.1 |
| 2,557,827 | 6/1951 | Krupp | 24—205.1 |
| 2,567,298 | 9/1951 | Morner. | |
| 2,746,113 | 5/1956 | Williams | 24—205.1 |
| 3,035,956 | 5/1962 | Gonda. | |

FOREIGN PATENTS

| | | |
|---|---|---|
| 1,448,529 | 6/1966 | France. |
| 314,024 | 3/1930 | Great Britain. |

BERNARD A. GELAK, Primary Examiner

U.S. Cl. X.R.

24—205.1